(12) United States Patent
Burns et al.

(10) Patent No.: US 7,651,557 B2
(45) Date of Patent: Jan. 26, 2010

(54) INKJET INKS COMPRISING MULTI-LAYER PIGMENTS

(75) Inventors: Elizabeth G. Burns, Windham, NH (US); Richard S. Hall, Dedham, MA (US)

(73) Assignee: Cabot Corporation, Boston, MA (US)

( * ) Notice: Subject to any disclaimer, the term of this patent is extended or adjusted under 35 U.S.C. 154(b) by 435 days.

(21) Appl. No.: 11/305,356

(22) Filed: Dec. 16, 2005

(65) Prior Publication Data

US 2006/0178447 A1 Aug. 10, 2006

Related U.S. Application Data

(60) Provisional application No. 60/637,375, filed on Dec. 17, 2004.

(51) Int. Cl.
*C09D 11/00* (2006.01)
(52) U.S. Cl. .................................................. 106/31.6
(58) Field of Classification Search ........................ None
See application file for complete search history.

(56) References Cited

U.S. PATENT DOCUMENTS

| | | | |
|---|---|---|---|
| 4,711,802 A | | 12/1987 | Tannenbaum |
| 5,135,812 A | | 8/1992 | Phillips et al. |
| 5,698,016 A | * | 12/1997 | Adams et al. .............. 106/31.6 |
| 5,851,280 A | * | 12/1998 | Belmont et al. ............. 106/472 |
| 5,871,572 A | * | 2/1999 | Marritt ..................... 106/31.36 |
| 5,966,150 A | * | 10/1999 | Lester et al. ................... 347/43 |
| 6,203,909 B1 | | 3/2001 | Chassot |
| 6,235,829 B1 | | 5/2001 | Kwan |
| 6,458,458 B1 | | 10/2002 | Cooke et al. |
| 6,472,455 B1 | | 10/2002 | Bleikolm et al. |
| 6,472,471 B2 | | 10/2002 | Cooke et al. |
| 6,479,146 B1 | | 11/2002 | Caruso et al. |
| 6,641,653 B2 | | 11/2003 | Yu |
| 6,699,319 B2 | | 3/2004 | Adams et al. |
| 6,723,783 B2 | | 4/2004 | Palumbo et al. |
| 6,747,073 B1 | | 6/2004 | Pfaff et al. |
| 6,911,073 B2 | | 6/2005 | Adams et al. |
| 7,030,174 B2 | | 4/2006 | Yatake |
| 7,045,146 B2 | | 5/2006 | Caruso et al. |
| 7,173,078 B2 | | 2/2007 | Lamprey et al. |
| 7,459,491 B2 | | 12/2008 | Tyvoll et al. |
| 7,544,238 B1 | | 6/2009 | Belmont |
| 2002/0147252 A1 | | 10/2002 | Adams |
| 2002/0149656 A1 | * | 10/2002 | Nohr et al. ..................... 347/95 |
| 2003/0152703 A1 | * | 8/2003 | Hammond et al. .......... 427/256 |
| 2003/0157260 A1 | | 8/2003 | Rubner et al. |
| 2004/0013721 A1 | | 1/2004 | Antipov et al. |

(Continued)

FOREIGN PATENT DOCUMENTS

EP 0 227 423 6/1992
EP 1 190 123 10/2002

OTHER PUBLICATIONS

Rubner, ph controlled fabrication of polyelectrolyte multilayers: assembly and applications, 2002, multilayer thin films, pp. 133-153.*

(Continued)

*Primary Examiner*—Melvin C Mayes
*Assistant Examiner*—Stefanie Cohen (57) ABSTRACT

The present invention relates to multi-layer pigments comprising a core pigment having attached two or more layers of polymer as well as to methods of preparing the multi-layer pigment. Also disclosed are inkjet ink compositions comprising these multi-layer pigments.

27 Claims, 3 Drawing Sheets

U.S. PATENT DOCUMENTS

| | | |
|---|---|---|
| 2004/0250750 A1 | 12/2004 | Reda et al. |
| 2007/0126839 A1 | 6/2007 | Kelly-Rowley et al. |
| 2007/0129462 A1 | 6/2007 | Ma |
| 2007/0129463 A1 | 6/2007 | Ma et al. |
| 2007/0224345 A1 | 9/2007 | Metz et al. |

OTHER PUBLICATIONS

International Search Report and Written Opinion of the International Searching Authority for International Application No. PCT/US2005/045777, mailed Apr. 27, 2006.

International Preliminary Report on Patentablity for International Application No. PCT/US2005/045777, mailed Jun. 28, 2007.

"Microencapsulation by means of step-wise adsorption of polyelectrolytes," G. B. Sulchorukov; E. Donath; S. Moya; A. S. Susha; A. Voigt; J. Hartmann; H. Mohwald, Journal of Microencapsulation: Micro and Nano Carriers, 1464-5246, vol. 17, Issue 2, 2000, pp. 177 - 185.

"Thin Multilayer Films of Weak Polyelectrolytes on Colloid Particles," Noritaka Kato et al., Max Planck Institute of Colloids and Interfaces, Macromolecules 2002, vol. 35, pp. 9780 - 9787.

* cited by examiner

INKJET INKS COMPRISING MULTI-LAYER PIGMENTS

CROSS REFERENCE TO RELATED APPLICATIONS

This patent application claims the benefit of U.S. Provisional Patent Application No. 60/637,375, filed Dec. 17, 2004.

BACKGROUND OF THE INVENTION

1. Field of the Invention

The present invention relates to multi-layer pigments, as well as to inkjet ink compositions comprising them.

2. Description of the Related Art

An inkjet ink composition generally consists of a vehicle, which functions as a carrier, and a colorant such as a dye or pigment. Additives and/or cosolvents can also be incorporated in order to adjust the inkjet ink to attain the desired overall performance properties.

In general, pigments alone are not readily dispersible in liquid vehicles. A variety of techniques have been developed which can provide stable pigment dispersions that can be used in inkjet printing. For example, dispersants can be added to the pigment to improve its dispersibility in a particular medium. Examples of dispersants include water-soluble polymers and surfactants. Typically, these polymeric dispersants have a molecular weight less than 20,000 in order to maintain solubility and therefore pigment stability.

The surface of pigments contain a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Multiple layers of charged materials have also been used to modify particle properties. For example, U.S. Pat. No. 6,479, 146 and U.S. Patent Publication No. 2002/0187197 describe a process for coating particles with consecutive alternating layers of oppositely charged polyelectrolytes. These are then further treated to remove the inner core. Multi-layering processes are also described in EP 1 190 123, U.S. Patent Publication No. 2004/0013721, and U.S. Pat. No. 6,203,909. However, none of these methods has been used for the preparation of pigments for inkjet ink applications.

Methods for the preparation of modified pigment products have also been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt.

Other methods to prepare modified pigments have also been described. For example, PCT Publication No. WO 01/51566 discloses methods of making a modified pigment by reacting a first chemical group and a second chemical group to form a pigment having attached a third chemical group. Ink compositions, including inkjet inks, containing these pigments are also described. Also, U.S. Pat. No. 5,698, 016 discloses a composition comprising an amphiphilic ion and a modified carbon product comprising carbon having attached at least one organic group. The organic group has a charge opposite to the amphiphilic ion. Also disclosed are aqueous and non-aqueous ink and coating compositions incorporating this composition, including ink jet ink compositions.

While these methods provide modified pigments having attached groups, there remains a need for improved processes for attaching groups and, in particular, polymeric groups, to a pigment. These additional methods may provide advantageous alternatives to forming modified pigments.

SUMMARY OF THE INVENTION

The present invention relates to a multi-layer pigment comprising a core pigment having attached two or more layers of polymer. The core pigment has either a positive or negative charge and may be either I) a dispersant-stabilized pigment or ii) a modified pigment such as a pigment having attached at least one ionic group, ionizable group, or mixture thereof or a pigment having attached at least one organic group that comprises at least one ionic group, ionizable group, or mixture thereof. The layer of polymer adjacent to the core pigment has a charge opposite to the charge of the core pigment, and each successive layer of polymer has a charge opposite to that of the preceding adjacent layer. Also disclosed is an inkjet ink composition comprising a vehicle and the multi-layer pigment described herein.

The present invention further relates to a method of preparing a multi-layer pigment comprising a core pigment, described above, having two or more layers of attached polyelectrolytes of alternating charge. The method comprises the steps of a) forming a pigment having one layer of attached polyelectrolyte by combining a core pigment having a positive or negative charge and a polyelectrolyte having a charge opposite to that of the core pigment, and b) forming a pigment having two or more layers of attached polyelectrolytes of alternating charge by combining the pigment formed in step a) and one or more additional polyelectrolyte in succession. The first additional polyelectrolyte has a charge opposite to that of the polyelectrolyte used in step a). Each successive additional polyelectrolyte has a charge opposite to that of the preceding polyelectrolyte. Optionally, each of steps a), b) or both may occur under high shear mixing conditions It is to be understood that both the foregoing general description and the following detailed description are exemplary and explanatory only and are intended to provide further explanation of the present invention, as claimed.

DETAILED DESCRIPTION OF THE INVENTION

The present invention relates to pigments having multiple layers of polymer, methods of preparing them, and inkjet ink compositions comprising them.

The multi-layer pigment of the present invention comprises a core pigment having attached two or more layers of polymer. In one embodiment, the core pigment is a dispersant-stabilized pigment comprising a pigment and a dispersant adsorbed onto the pigment. As described above, a dispersant is a material that improves the dispersibility of a pigment in a particular liquid medium. In general, a dispersant is a material that has solubility in the liquid medium but also has an affinity for the surface of the material to be dispersed. For the core pigment used in the present invention, any dispersant known in the art may be used, including polymeric dispersants or surfactants. Preferably the dispersant is a polymeric dispersant having a positive or negative charge.

In another embodiment, the core pigment is a modified pigment. For example, the core pigment may comprise a pigment having attached at least one ionic group, ionizable group, or mixture thereof. Examples include pigments that have been oxidized using an oxidizing agent in order to introduce ionic and/or ionizable groups onto the surface. Modified pigments prepared in this way have been found to have a higher degree of oxygen-containing groups on the surface. Oxidizing agents include, but are not limited to, oxygen gas, ozone, peroxides such as hydrogen peroxide, persulfates, including sodium and potassium persulfate, hypohalites such a sodium hypochlorite, oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. Other surface modification methods, such as chlorination and sulfonylation, may also be used, to introduce ionic or ionizable groups.

In addition, the core pigment may comprise a pigment having attached at least one organic group, wherein the organic group comprises at least one ionic group, at least one ionizable group, or mixtures thereof. These modified pigments may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the pigment compared to dispersant type methods, which use, for example, polymers and/or surfactants.

For both embodiments, the pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982). Preferably the pigment is a cyan, magenta, yellow, or black pigment, such as carbon black.

The pigment can have a wide range of BET surface areas, as measured by nitrogen adsorption, depending on the desired properties of the pigment. As known to those skilled in the art, a higher surface area will correspond to smaller particle size. If a higher surface area is not readily available for the desired application, it is also well recognized by those skilled in the art that the pigment may be subjected to conventional size reduction or comminution techniques, such as ball or jet milling, to reduce the pigment to a smaller particle size, if desired.

As described above, in one embodiment the core pigment is a modified pigment comprising a pigment having attached at least one ionic group, ionizable group, or a mixture of an ionic group and an ionizable group. In another embodiment, the core pigment is a modified pigment comprising a pigment having attached at least one organic group, wherein the organic group comprises at least one ionic group, ionizable group, or a mixture thereof. An ionic group is either anionic or cationic and is associated with a counterion of the opposite charge including inorganic or organic counterions such as $Na^+$, $K^+$, $Li^+$, $NH_4^+$, $NR'_4{}^+$, acetate, $NO_3^-$, $SO_4{}^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Anionizable groups form anions and cationizable groups form cations. Preferably, the attached group is an organic group. Organic ionic groups include those described in U.S. Pat. No. 5,698,016, the description of which is fully incorporated herein by reference.

Anionic groups are negatively charged ionic groups that may be generated from groups having ionizable substituents that can form anions (anionizable groups), such as acidic substituents. They may also be the anion in the salts of ionizable substituents. Representative examples of anionic groups include $—COO^-$, $—SO_3^-$, $—OSO_3^-$, $—HPO_3^-$, $—OPO_3{}^{-2}$, and $—PO_3{}^{-2}$. Representative examples of anionizable groups include $—COOH$, $—SO_3H$, $—PO_3H_2$, $—R'SH$, $—R'OH$, and $—SO_2NHCOR'$, where R' represents hydrogen or an organic group such as a substituted or unsubstituted aryl and/or alkyl group. Preferably, the attached group comprises a carboxylic acid group, a sulfonic acid group, a sulfate group, or salts thereof. For example, the attached group may be an organic group such as a benzene carboxylic acid group, a benzene dicarboxylic acid group, a benzene tricarboxylic acid group, a benzene sulfonic acid group, or salts thereof. The attached organic group may also be a substituted derivative of any of these.

Cationic groups are positively charged organic ionic groups that may be generated from ionizable substituents that can form cations (cationizable groups), such as protonated amines. For example, alkyl or aryl amines may be protonated in acidic media to form ammonium groups $—NR'_2H^+$, where R' represent an organic group such as a substituted or unsubstituted aryl and/or alkyl group. Cationic groups may also be positively charged organic ionic groups. Examples include quaternary ammonium groups ($—NR'_3{}^+$) and quaternary phosphonium groups ($—PR'_3{}^+$). Here, R' represents hydrogen or an organic group such as a substituted or unsubstituted aryl and/or alkyl group. Preferably, the attached group comprises an alkyl amine group or a salt thereof or an alkyl ammonium group.

When the core pigment comprises a pigment having attached organic groups, the organic group may be polymeric.

Preferably, the polymeric group comprises the ionic or ionizable groups described above. Thus, the organic group may be a polymeric group comprising one or more anionic or anionizable groups. Examples include, but are not limited to, polyacids such as polyacrylic acid, polymethacrylic acid, copolymers of acrylic acid or methacrylic acid, including styrene-acrylic acid polymers, and hydrolyzed derivatives of maleic anhydride-containing polymers. The organic group may also be a polymeric group comprising one or more cationic or cationizable groups. Examples include, but are not limited to, linear or branched polyamines such as polyethyleneimine (PEI), oligomers of ethyleneimine (such as pentaethyleneamine, PEA) and derivatives of polyethyleneimine. The organic group may also be a polymeric group comprising one or more naturally occurring polymers, such as proteins or carbohydrates.

The multi-layer pigment of the present invention comprises a core pigment having attached two or more layers of polymer. For example, the multi-layer pigment may have 2, 3, 4 or more layers of polymers, but preferably has less than 10 layers of polymer. Thus, the multi-layer pigment may have attached between 2 and 10 layers, including 4 to 8 layers. Preferably, the attachment is by ionic interactions, and the polymer is therefore preferably a polyelectrolyte, which is a polymer having ionic groups, ionizable groups, or mixtures thereof. As described above in relation to the modified pigments, an ionic group is either anionic or cationic and is associated with a counterion of the opposite charge. An ionizable group is one that is capable of forming an ionic group in the medium of use. Anionizable groups form anions and cationizable groups form cations. Thus, the polymer used to form layers on the modified pigment is preferably polyanionic or polycationic. Examples of polyelectrolytes include those described above relating to the attached polymeric groups of the modified pigment. Thus, the polyelectrolyte may include polyacids such as polyacrylic acid, polymethacrylic acid, copolymers of acrylic acid or methacrylic acid, including styrene-acrylic acid polymers, hydrolyzed derivatives of maleic anhydride-containing polymers, polyesters with charged groups such as sulfonates, and polyurethanes wit charged groups, such as carboxylates, polyphenols and polyphenolates. The polyelectrolyte may also include linear or branched polyamines such as polyethyleneimine (PEI), oligomers of ethyleneimine (such as pentaethyleneamine, PEA), derivatives of polyethyleneimine, and amino acrylate polymers (such as dimethylaminoethyl methacrylate or acrylate homo- or copolymers), PAMAMs or other quaternary amine polymers, and polyallyl amines. The polyelectrolyte may also be a naturally occurring polymer, such as proteins or carbohydrates.

Each of the polymer layers attached to the core pigment has a charge opposite to that of the layer which precedes it. Thus, for example, if the first layer of polymer is polycationic, then the second layer of polymer is polyanionic. Alternatively, if the first layer is a polymer that has an overall negative charge, then the second layer would be a polymer having an overall positive charge. Each successive layer preferably alternate in charge. The first layer of polymer has a charge opposite to that of the core pigment. If the core pigment has a negative charge (for example, having attached anionic or anionizable groups), then the first layer of polymer is preferably a polyelectrolyte having a positive charge (i.e., having cationic or cationizable groups). The next layer of polymer will then have the opposite charge. Thus, the multi-layer pigment of the present invention is preferably a core pigment having attached multiple layers of polymers having alternating charge.

The outer layer of polymer is a polymer that comprises groups which enable the multi-layer pigment to be dispersible in a liquid vehicle. Any polymer may be used, including the polyelectrolytes described above, but this polymer must also comprise groups having a charge opposite to the polymer layer below it. For example, the polymer in the outer layer of the multi-layer pigment of the present invention may be a polyelectrolyte that also comprises alkyleneoxide groups, including, for example, ethylene oxide groups, propylene oxide groups, or combinations thereof. The outer layer can be tailored to adjust various properties of the multi-layered pigment, including, for example, the pigment's affinity for a substrate onto which it is printed.

Any of the layers of polymer may further comprise crosslinking groups, and, in this way, any of the polymer layers may be crosslinked after attaching to the modified pigment, either to itself or to at least one adjacent layer. Examples of crosslinking groups include, but are not limited to, epoxide groups, isocyanate groups, amine groups, carboxylic acid groups, anhydride groups, thiol groups, and allyl groups. These may be crosslinked using any method known in the art. For example, allyl groups incorporated into both anionic and cationic polyelectrolytes may be crosslinked by the introduction of free radicals. Also, oxidation may used to crosslink a mixture of functional groups. Furthermore, the crosslinking groups may be a combination of groups that can react to form a linking group, such as a carboxylic acid and an amine may form an amide when treated with peptide-linking groups such as carbodiimides. Preferably, the outer layer comprises the crosslinking group.

The amount of polymer used for each layer will vary depending on a variety of factors, including the particle size of the modified pigment, the number of layers attached, the charge of the polymer layer, and the type and class of polymer used, including its molecular weight. In general, an amount of polymer is present such that the total amount of polymer is between about 20 and 2000 parts per hundred parts pigment, preferably between about 50 and 1000 parts, more preferably between about 200 and 800 parts, and most preferably between about 100 and 400 parts. The relative thickness of individual layers, that is, the amount of polymer present in a layer, can be adjusted or changed depending on, for example, the type and charge of the preceding layer.

The multi-layer pigments of the present invention may be prepared using any method known in the art such that multiple layers of polymers can be attached to a pigment. Preferably, these pigments are prepared using a method that comprises the steps of combining a core pigment and a polymer, preferably a polyelectrolyte having a charge opposite to that of the core pigment. The core pigment and polymer can be any of those described above. A salt, such as sodium chloride or sodium nitrate, may optionally also be included.

The components can be combined using any method known in the art, but are preferably combined under high shear conditions. For the purposes of the present invention, "high shear" means an energy sufficient to produce and/or maintain a pigment particle size distribution throughout the mixing step, which continually exposes new surfaces of the pigment to the added polymer, thereby improving the distribution and level of polymer attachment as well as the overall product yield. The mixing may take place in any suitable vessel under high shear conditions and utilizes equipment capable of providing a continued particle size reduction. Examples include, but are not limited to, equipment capable of providing a grinding, impact, or similar impingement action, such as horizontal media mills, vertical media mills such as attritors, ball mill, hammer mills, pin disk mills, fluid energy mills, jet mills, fluid jet mills, impingement jet mills, rotostators, pelletizers, homogenizers, sonicators, cavitators, and the like. In addition, the vessel may be preferably equipped with suitable means for adding heat, such as a heating mantle, thermocouple and the like. The mixing can take place under a wide variety of temperatures and for any suitable time in order to form a pigment having an attached polymer layer. Also, the mixing can preferably take place under high solids conditions—that is, the core pigment is present in the mixture at levels preferably greater than 10% by weight.

By combining the components described above, optionally under high shear conditions, a pigment having one layer of attached polymer, such as a polyelectrolyte, is formed. In a second step, this pigment is then combined with one or more additional polymers, such as polyelectrolytes, in succession. When a polyelectrolyte is used, each additional polyelectrolyte is added sequentially and optionally mixed under high shear conditions. Salt may also optionally be used. The first additional polyelectrolyte has a charge opposite to that of the polyelectrolyte used in the preceding step and may be any of those described above. Each successive additional polyelectrolyte has a charge opposite to that of the preceding polyelectrolyte, and may also be any of those described above. In this way, a pigment having multiple layers of attached polyelectrolytes is formed, where the layers of polyelectrolytes alternate in charge.

The method of the present invention may also include a step of substantially removing free material, such as unattached polyelectrolyte or soluble salts, after each or any mixing step. For example, if unattached polyelectrolyte interferes with the attachment of a subsequent layer of polymer, it may be desirable to remove the unattached or free polymer. Thus, the method of the present invention may further include a purification step in which free ionic species, such as unattached polyelectrolytes or soluble salts, are removed. Any method known in the art for substantially removing free ionic species may be used, including, for example, ultrafiltration/diafiltration using a membrane, reverse osmosis, and ion exchange. Other purification steps may also be used, including for example, washing, such as by filtration, centrifugation, or a combination of the two methods. The products may also be isolated, for example, by evaporation or it may be recovered by filtration and drying using known techniques to those skilled in the art.

As described above, the method of the present invention comprises the step of combining a core pigment and a polymer, preferably a polyelectrolyte, having a charge opposite to that of the core pigment. In a further step, additional polyelectrolyte is added, wherein the first additional polyelectrolyte has a charge opposite to that of the first polyelectrolyte, and subsequent additions of polyelectrolyte produce layers with alternating charges. Therefore, it is possible during the method of the present invention to use analytical techniques that measure particle charge in order to determine when enough polymer has been added to form a desired layer. Examples of such measurements are included in U.S. Pat. No. 6,641,656, which is incorporated in its entirety by reference herein. Thus, for example, the zeta potential of the core pigment and each or any of the intermediate pigment products having attached polymer layers may be measured. As a polyelectrolyte is added to a pigment having a known or previously determined zeta potential, a change in surface charge would be expected if the added polyelectrolyte has an opposite charge. Once the charge has switched, sufficient polymer has been added. Other methods of determining how much polymer or polyelectrolyte to add may also be used.

As discussed above, while it is known that multiple layers of polyelectrolytes can be attached to the surface of polymeric colloidal particles in order to provide an encapsulated polymeric material for use in pharmaceutical applications, as well as to particles to produce composite pigments, such materials are generally very large in size and therefore would not be useful in inkjet ink applications. It has surprisingly been found that multiple layers of polymers, especially layers of polyelectrolytes having alternating charges, can be attached to a core pigment, such as dispersant-stabilized pigment or a modified pigment, resulting in the formation of a stable pigment dispersion that can be used as an inkjet ink composition.

Thus, the present invention further relates to an inkjet ink composition comprising a vehicle and a multi-layer pigment. The vehicle can be either an aqueous or non-aqueous liquid vehicle, but is preferably a vehicle that contains water. Thus, the vehicle is preferably an aqueous vehicle, which is a vehicle that contains greater than 50% water and can be, for example, water or mixtures of water with water miscible solvents such as alcohols. Preferably the aqueous vehicle is water, and the inkjet ink composition is an aqueous inkjet ink composition.

The inkjet ink composition of the present invention can be formed with a minimum of additional components (additives and/or cosolvents) and processing steps. The multi-layer pigments are the same as described above and are present in the inkjet ink composition in an amount effective to provide the desired image quality (for example, optical density) without detrimentally affecting the performance of the inkjet ink. For example, typically, the multi-layer pigment will be present in an amount ranging from about 0.1% to about 30% based on the weight of the ink. This is, in general, higher than for conventional pigments. Thus, the inkjet ink composition can comprise higher levels of pigment by weight using a multi-layer pigment than using conventional pigments due to the presence of the polymer layers. More or less pigment may be used depending on the amount of attached polymer. It is also within the bounds of the present invention to use a formulation containing a mixture of the multi-layer pigments described herein and unmodified pigments, other modified pigments, or both.

Suitable additives may also be incorporated into the inkjet ink composition of the present invention in order to impart a number of desired properties while maintaining the stability of the compositions. For example, surfactants may be added to further enhance the colloidal stability of the composition or to change the interaction of the ink with either the printing substrate, such a printing paper, or with the ink printhead. Other additives are well known in the art and include humectants, biocides, binders, drying accelerators, penetrants, and the like. The amount of a particular additive will vary depending on a variety of factors but generally ranges between 0% and 40%. Additionally, the inkjet ink composition of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink composition can be purified and/or classified using methods such as those described above for the multi-layer pigments. An optional counterion exchange step can also be used. In this way, unwanted impurities or undesirable large particles can be removed to produce an ink with good overall properties.

The present invention will be further clarified by the following examples which are intended to be only exemplary in nature.

EXAMPLES

Example 1

Magenta Pigment with Layers of PAH and PAA

Attaching PAH: 100 g of Cab-O-Jet® 260M magenta colorant (a 10% solids aqueous dispersion of a sulfonated magenta pigment commercially available from Cabot Corporation) was diluted with water to 200 g. In a separate container, polyallylamine hydrochloride (PAH, 10 g, MW 60,000, available from Aldrich Chemical Company) was dissolved in 1 L of 0.1M $NaNO_3$. The pigment dispersion was added dropwise to the polymer solution under vigorous agitation using a cowles blade. Flocked, or precipitated, material was visually observable. Using a Mixtronix sonicator fitted with a flow-cell and a peristaltic pump, the resulting material was sonicated for thirty minutes. The volume-weighted mean particle size (mv) was measured using a Microtrac UPA 150 and was found to be 230 nm. The dispersion was concentrated to 200 mL by diafiltration through a Spectrum Membranes Mini-Kross membrane and then purified by diafiltration with 1 L of distilled water to form a dispersion of a magenta pigment having an attached layer of PAH.

Attaching PAA: Polyacrylic acid, partial sodium salt, (PAA, 10 g, MW 2000, available from Scientific Polymer Products) was dissolved in 1 L of 0.1M $NaNO_3$. The pH was adjusted to approximately neutral with 10% wt/wt sodium hydroxide. A Mixtronix sonicator fitted with a flow-cell and a peristaltic pump was further equipped with a septum-capped "T" in the hose between the pump and the inlet to the sonic cell. Using a syringe and needle, 20 mL of the magenta pigment dispersion having one layer of polyelectrolyte was injected into the flow stream, with the sonic probe active. Flocks of pigment became visible. The pH was adjusted to 10 with 10% sodium hydroxide, and the resulting mixture was sonicated for 10 minutes. The volume-weighted mean particle size (mv) was measured using a Microtrac UPA 150 and was found to be 120 nm. After checking the pH to ensure it was still approximately 10, the addition of the magenta pigment dispersion having one layer of polyelectrolyte was continued until all of the dispersion from the first step was consumed (approximately 30 minutes), and the resulting mixture was sonicated for an additional 20 minutes. The measured particle size (mv) was found to be 90 nm. The resulting dispersion was concentrated to 200 mL by diafiltration through a Spectrum Membranes Mini-Kross membrane, and then purified by diafiltration with 1 L of distilled water. This resulted in the formation of a dispersion of a magenta pigment having attached a layer of PAH and a layer of PAA, which is a multi-layer magenta pigment of the present invention.

The zeta potential and mobility of each pigment dispersion were measured using a Brookhaven Zeta Plus. Results are shown in Table 1 below.

TABLE 1

| Layer # | Polymer | Mobility | Zeta Potential |
|---------|---------|----------|----------------|
| 0       | none    | −2.56    | −32.7          |
| 1       | PAH     | 2.27     | 29             |
| 2       | PAA     | −1.77    | −22.57         |

Figure 1:
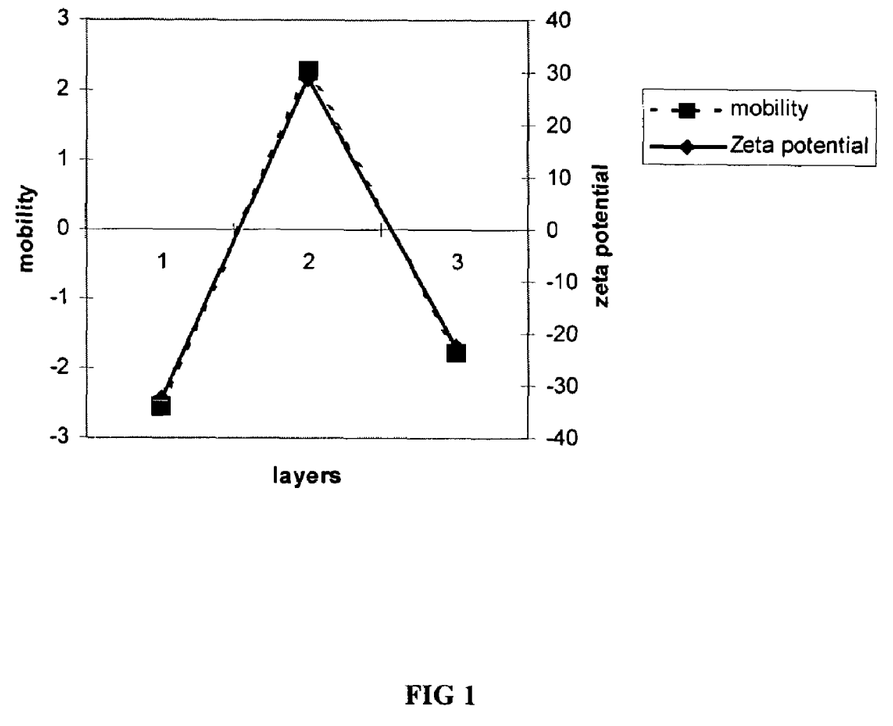
FIG. 1 and FIG. 2 show changes in zeta potential and mobility as layers of polymer are added to a modified pigment using the method of the present invention.

These results clearly show the change in the charge of the pigment particles due to the outermost layer. Particles having an outer layer of PAH were measured at pH 2 and those having an outer layer of PAA were measured at pH 11. This data is also shown graphically in FIG. 1. Thus, zeta potential and mobility can be used to determine whether enough polyelectrolyte has been added to cover the previous polymer layer.

Example 2

Magenta Pigment with Layers of PAH, PAA, and PAH

Attaching PAH: Polyallylamine hydrochloride (10 g, MW 60,000, available from Scientific Polymer Products) was dissolved in 1 L of 0.1 M $NaNO_3$. The solution was pumped through a Mixtronix sonicator fitted with a flow-cell and a peristaltic pump and further equipped with a septum-capped "T" in the hose between the pump and the inlet to the sonic cell. Using a syringe and needle, 100 mL of Cab-O-Jet® 260M magenta colorant (commercially available from Cabot Corporation) was injected into the flow stream, with the sonic probe active. Sonication was continued for an additional 15 minutes. The volume-weighted mean particle size was measured using a Microtrac UPA 150 and was found to be 297 nm. The resulting dispersion was concentrated to 300 mL by diafiltration through a Spectrum Membranes Mini-Kross membrane, and then purified by exchange with an additional 1.5 L distilled water to form 200 mL of a dispersion of a magenta pigment having attached one layer of PAH.

Attaching PAA: Using the procedure described in Example 1, a layer of PAA was attached to the magenta pigment having attached one layer of PAH, to form a dispersion of a multi-layer magenta pigment of the present invention having attached a layer of PAH and a layer of PAA.

Attaching PAH: A second layer of PAH was attached to this multi-layer pigment, using the procedure described above, to give a dispersion of a pigment having a layer of PAH, a layer of PAA, and a layer of PAH, which is a multi-layer magenta pigment of the present invention. The particle size of this dispersion was measured as described above and was found to be 125 nm.

Example 3

Magenta Pigment with Layers of PAH, PAA, PAH, and PAA

A dispersion of a multi-layer magenta pigment having attached layers of PAH, PAA, and PAH was prepared as described in Example 2. Then, using the procedure described in Example 2 for attaching PAA, a second layer of PAA was attached to this multi-layer pigment, to give a dispersion of a pigment having a layer of PAH, PAA, PAH, and PAA, which is a multi-layer magenta pigment of the present invention. The particle size of this dispersion was measured as described above and found to be 118 nm.

The zeta potential and mobility of each pigment dispersion were measured using the procedure described in Example 1. Results are shown in Table 2 below.

TABLE 2

| Layer # | Polymer | Mobility | Zeta Potential |
|---------|---------|----------|----------------|
| 0       | none    | −2.56    | −32.7          |
| 1       | PAH     | 1.7      | 21.8           |
| 2       | PAA     | −1.67    | −21.6          |

TABLE 2-continued

| Layer # | Polymer | Mobility | Zeta Potential |
|---|---|---|---|
| 3 | PAH | 1.24 | 15.87 |
| 4 | PAA | −2.8 | −35.8 |

Figure 2:
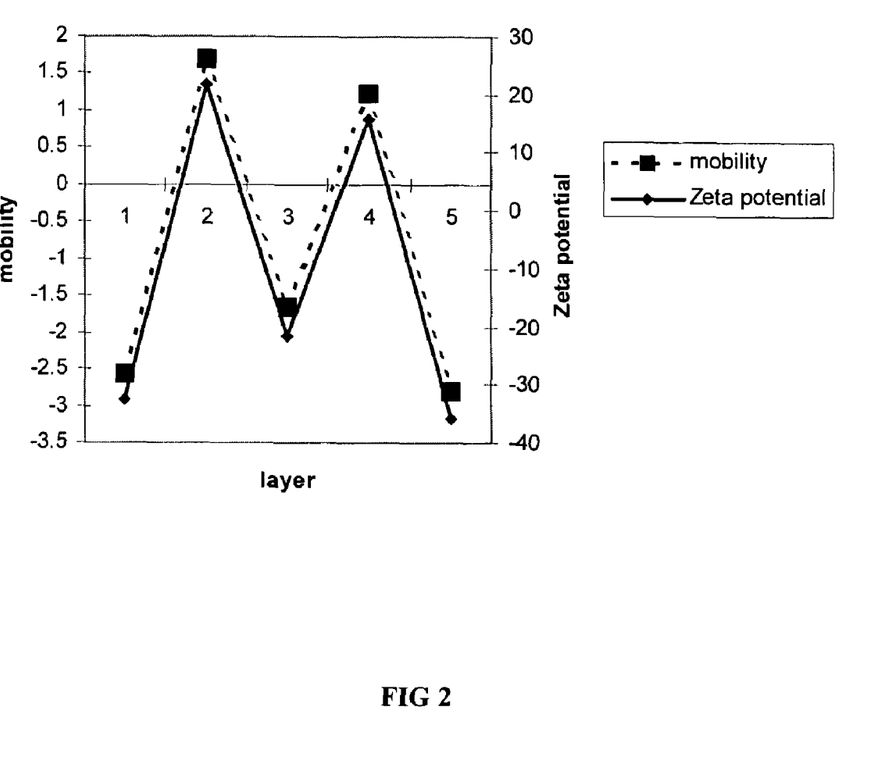

These results clearly show the change in the charge of the pigment particles due to the outermost layer. This data is also shown graphically in FIG. 2. Thus, zeta potential and mobility can be used to determine whether enough polyelectrolyte has been added to cover the previous polymer layer.

Example 4

Cyan Pigment with Layers of PAH and PAA

A dispersion of a multi-layer cyan pigment of the present invention, having attached layer of PAH and a layer of PAA, was prepared using the procedure described in Example 1, with the exception that Cab-O-Jet® 250C cyan colorant (a 10% solids aqueous dispersion of a sulfonated cyan pigment commercially available from Cabot Corporation) was used.

The amount of polymer in the multi-layer pigment dispersion was measured by comparing the UV/Vis absorbance of the multi-layer pigment in the dispersion of a known concentration (% solids) to that of a dispersion of the starting pigment at the same concentration (% solids), using a wavelength where the pigment absorbs. The extinction coefficient for both the pigment of the multi-layer pigment and the starting pigment will be the same. Since both dispersions are at the same concentration, any decrease in absorbance must be due to a difference in the actual amount of pigment in the multi-layer pigment dispersion. This difference is the amount of polymer present. If the pigment dispersion was purified by diafiltration to substantially remove unattached polymer at each stage of addition, the amount of polymer present represents the amount of total polymer in the layers of the multi-layer pigment.

For the cyan pigment used in this example, a wavelength of 614 nm was chosen for absorbance measurements on the UV/Vis Spectrophotometer. Results of amount of polymer present after attaching each layer is shown in Table 3 below and is expressed as parts per hundred parts of pigment.

TABLE 3

| Layer # | Polymer | % Solids | Particle Size | pph Polymer |
|---|---|---|---|---|
| 1 | PAH | 8.87 | 490 | 77.1 |
| 2 | PAA | 14.06 | 177 | 135.0 |

Example 5

Cyan Pigment with Layers of PAH, PAA, PAH, and PAA

A dispersion of a multi-layer cyan pigment of the present invention, having attached layers of PAH, PAA, PAH, and PAA, was prepared using the procedure described in Example 2, with the exception that Cab-O-Jet® 250C cyan colorant (a 10% solids aqueous dispersion of a sulfonated cyan pigment commercially available from Cabot Corporation) was used.

The amount of polymer present after attaching each layer was determined as described in Example 4 and is shown in Table 4 below (expressed as parts per hundred parts of pigment).

TABLE 4

| Layer # | Polymer | % Solids | Particle Size | pph Polymer |
|---|---|---|---|---|
| 1 | PAH | 4.75 | 477 | 84.5 |
| 2 | PAA | 6.27 | 116 | 137.5 |
| 3 | PAH | 3.03 | 1049 | 471.4 |
| 4 | PAA | 6.72 | 466 | 624.6 |

Example 6

An inkjet ink was prepared having the following composition: 5 wt % trimethylene glycol monobutyl ether, 10 wt % glycerine, 1% Surfynol 465 (available from Air Products), 4 wt % pigment, and the balance water. For this example, the pigment was the multi-layer magenta pigment of Example 3. The inkjet ink composition was loaded into an empty Epson Black C82 printer cartridge and was printed using the Epson Stylus C82 printer on Canon PP101 and PR101, both photo-quality inkjet media. The printed images were allowed to dry for 24 hours and were tested for resistance to physical abrasion (by rubbing with a dry cotton swab), waterfastness (by dripping water across the image), and gloss (visual appearance). The images were found to be durable to both physical abrasion and water (good waterfastness) and had good gloss appearance compared to prints prepared using the starting pigment, Cab-O-Jet® 260 M magenta colorant.

Example 7

An inkjet ink was prepared having the composition shown in Example 6, with the exception that the pigment was the multi-layer cyan pigment of Example 4. Printed images were produced as shown in Example 6, and the resulting prints were found to be high in waterfastness and durability to physical abrasion compared to images prepared using the starting pigment, Cab-O-Jet® 260C cyan colorant. In addition, the images prepared using the multi-layered pigment were found visually to have improved chroma and little to no bronzing (appearance of a red tint when the printed image is observed at an oblique angle).

Example 8

Black Pigment with Layers of PAH and PAA

Attaching PAH: 20 g of polyallylamine hydrochloride (PAH, MW 70,000, available from Aldrich Chemical Company) were dissolved in 180 g of 100 mM $NaNO_3$. The solution was agitated at approximately 4000 rpm using a rotor-stator mixer, and to the mixing solution was added 267 g Cab-O-Jet® 300 (a 15% solids aqueous dispersion of a carboxylated black pigment commercially available from Cabot Corporation) over 30 minutes. The agitation was continued for an additional 30 minutes, at which time, the pH was 3.87. The resulting dispersion was purified by diafiltration with 2 volumes of 100 mM $NaNO_3$, followed by 9 volumes of water, to form a dispersion of a black pigment having an attached layer of PAH. The volume-weighted mean particle size (mv) was measured using a Microtrac UPA 150 and was found to be 420 nm. Also, the volatile content of the pigment was measured by combustion analysis and found to be 26 pph volatile.

Attaching PAA: The black pigment dispersion having one layer of polyelectrolyte (205 g dispersion, 20 g solids) was agitated with a rotor-stator mixer. To this was added 20 g of a 10% solution of polyacrylic acid, sodium salt (PAA, molecular weight 100,000, available from Aldrich) in 100 mM $NaNO_3$ over 30 minutes. Agitation was continued for another 85 minutes. The particle size was measured using a Microtrac UPA 150 and was found to be 585 nm, measured in 100 mM $NaNO_3$. The resulting dispersion was purified by diafiltration with 1 volume of 100 mM $NaNO_3$ followed by 9 volumes of water, to form a dispersion of a black pigment having attached layers of PAH and PAA. The volume-weighted mean particle size (mv) was measured using a Microtrac UPA 150 and was found to be 582 nm, measured in 100 mM $NaNO_3$. Also, the volatile content of the pigment was measured by combustion analysis and found to be 26 pph volatile.

Example 9

Figure 3:
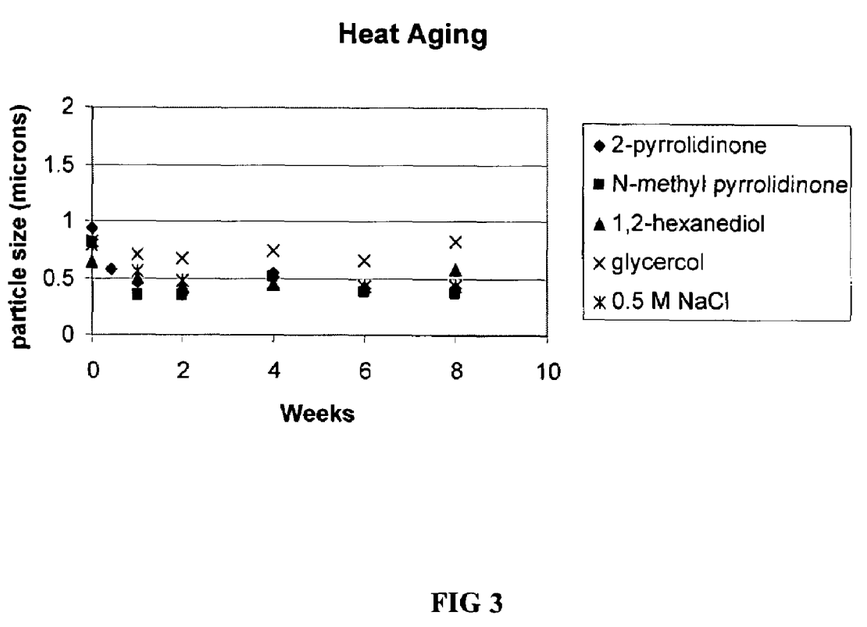
FIG. 3 shows the results of heat stability studies for a dispersion of a multi-layer pigment of the present invention.

The dispersion of a multi-layer black pigment having attached layers of PAH and PAA of Example 8 was subjected to heat aging. Samples were prepared at 5% by weight pigment, 20% by weight solvent, and the balance water. The solvents used were 2-pyrrolidinone, N-methyl-pyrrolidinone, 1,2-hexanediol, glycerol, and 0.5M NaCl. These samples were heated to 70° C. and evaluated for particle size change over a period of six weeks. A control sample in water was also aged. The results are shown in FIG. 3. As the results show, the dispersions of the multi-layer pigment of the present invention were stable after heat aging in various solvents.

Example 10

Efficient Assembly of a Black Pigment with a Layer of PAH

The dispersion of the multi-layer black pigment of Example 2 was prepared from a dispersion of a black pigment having an attached first layer of PAH. A similar dispersion of black pigment was prepared using a similar procedure described in Example 2, with the exception that 267 g Cab-O-Jet®300 (a 15% solids aqueous dispersion of a carboxylated black pigment commercially available from Cabot Corporation) and 10 g of polyallylamine hydrchloride (PAH, molecular weight 15,000, available from Aldrich Chemical Company) was used. The resulting dispersion was purified by diafiltration using 5 volumes of water, and was found to be equally pure as the dispersion of black pigment having attached a first layer of Example 2, measured by the surface tension of the permeate. This demonstrates easier purification of the process when less polymer is used.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inkjet ink composition comprising a) a vehicle and b) a multi-layer pigment comprising a core pigment having attached two or more layers of polymer,
    wherein the core pigment has a positive or negative charge and is a modified pigment comprising a pigment having attached at least one organic group, wherein the organic group comprises at least one ionic group, ionizable group, or mixture thereof,
    wherein the layer of polymer adjacent to the core pigment has a charge opposite to that of the core pigment, and
    wherein each successive layer of polymer has a charge opposite to that of the preceding adjacent layer.

2. The inkjet ink composition of claim 1, wherein the organic group is polymeric.

3. The inkjet ink composition of claim 1, wherein at least one layer of polymer is a layer of polyelectrolyte.

4. The inkjet ink composition of claim 1, wherein the multi-layer pigment comprises between 2 and 10 layers of polymer.

5. The inkjet ink composition of claim 1, wherein the multi-layer pigment comprises between 3 and 6 layers of polymer.

6. The inkjet ink composition of claim 1, wherein the multi-layer pigment comprises 2 layers of polymer.

7. The inkjet ink composition of claim 1, wherein at least one layer of polymer is a layer of crosslinked polyelectrolyte.

8. The inkjet ink composition of claim 7, wherein the layer of crosslinked polyelectolyte is the final layer of polymer.

9. The inkjet ink composition of claim 7, wherein at least one layer of polymer is crosslinked to at least one adjacent layer of polymer.

10. The inkjet ink composition of claim 1, wherein the vehicle is an aqueous vehicle.

11. A multi-layer pigment comprising a core pigment having attached two or more layers of polymer,
    wherein the core pigment has a positive or negative charge and is a modified pigment comprising a pigment having attached at least one organic group, wherein the organic group comprises at least one ionic group, ionizable group, or mixture thereof,
    wherein the layer of polymer adjacent to the core pigment has a charge opposite to that of the core pigment, and
    wherein each successive layer of polymer has a charge opposite to that of the preceding adjacent layer.

12. The multi-layer pigment of claim 11, wherein the organic group is polymeric.

13. The multi-layer pigment of claim 11, wherein at least one layer of polymer is a layer of polyelectrolyte.

14. The multi-layer pigment of claim 11, wherein the multi-layer pigment comprises between 2 and 10 layers of polymer.

15. The multi-layer pigment of claim 11, wherein the multi-layer pigment comprises between 3 and 6 layers of polymer.

16. The multi-layer pigment of claim 11, wherein the multi-layer pigment comprises 2 layers of polymer.

17. The multi-layer pigment of claim 11, wherein at least one layer of polymer is a layer of crosslinked polyelectrolyte.

18. The multi-layer pigment of claim 17, wherein the layer of crosslinked polyelectnolyte is the final layer of polymer.

19. A method of preparing a multi-layer pigment comprising a core pigment having two dr more layers of attached polyelectrolyte of alternating charge comprising the steps of:
    a) combining a core pigment having a positive or negative charge and a polyelectrolyte having a charge opposite to that of the core pigment, optionally under high shear mixing conditions, to form a pigment having one layer of attached polyelectrolyte; and
    b) combining the pigment formed in step a) and one or more additional polyelectrolytes in succession, optionally under high shear conditions, wherein the first additional polyelectrolyte has a charge opposite to that of the polyelectrolyte used in step a) and wherein each successive additional polyelectrolyte has a charge opposite to that of the preceding polyelectrolyte, to form a pigment having two or more layers of attached polyelectrolytes of alternating charge, wherein the core pigment is a modified pigment comprising a pigment having attached at least one organic group, wherein the organic group comprises at least one ionic group. ionizable group, or mixture thereof.

20. The method of claim 19, wherein 1 to 9 additional polyelectrolytes are used in step b).

21. The method of claim 19, wherein 1 to 5 additional polyelectrolytes are used in step b).

22. The method of claim 19, further comprising the step of substantially removing free polyelectrolyte after step a) substantially removing free polyelectrolyte in between each successive combination of additional polyelectrolyte in step b), or combinations thereof.

23. The method of claim 19, further comprising the step of crosslinking the layer of attached polyelectrolyte in step a), crosslinking at least one additional layer of attached polyelectrolyte of step b), or combinations thereof.

24. The method of claim 19, further comprising the step of crosslinking the last additional layer of attached polyelectrolyte.

25. The method of claim 19, further comprising the step of crosslinking the layer of attached polyelectrolyte in step a), at least one additional layer of attached polyelectrolyte of step b), or combinations thereof, to at least one adjacent layer of attached polyelectrolyte.

26. The method of claim 19, wherein a salt is added in step a), in step b), or combinations thereof.

27. The method of claim 19, wherein the organic group is polymeric.

* * * * *